United States Patent [19]
Kikuchi

[11] Patent Number: 6,048,109
[45] Date of Patent: Apr. 11, 2000

[54] APPARATUS ADAPTED TO USE SHAPE MEMORY MEMBER

[75] Inventor: Hiroshi Kikuchi, Kanagawa-ken, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/595,758

[22] Filed: Feb. 2, 1996

[30] Foreign Application Priority Data

Feb. 7, 1995 [JP] Japan ................................. 7-019175

[51] Int. Cl.[7] .......................... G03B 17/00; G03B 17/02
[52] U.S. Cl. ........................................ 396/439; 396/536
[58] Field of Search ........................... 354/288; 396/439, 396/448, 536, 543, 401

[56] References Cited

U.S. PATENT DOCUMENTS

| | | | |
|---|---|---|---|
| 4,106,041 | 8/1978 | Lange | 354/206 |
| 4,193,678 | 3/1980 | In Son | 354/204 |
| 4,527,873 | 7/1985 | Alligood | 354/121 |
| 4,664,493 | 5/1987 | Takagi | 354/251 |
| 4,860,040 | 8/1989 | Tamamura et al. | 354/170 |
| 5,012,269 | 4/1991 | Tosaka et al. | 354/419 |
| 5,083,148 | 1/1992 | Tsuboi | 354/400 |
| 5,150,702 | 9/1992 | Miyanaga et al. | 128/6 |
| 5,185,621 | 2/1993 | Kagechika | 354/234.1 |
| 5,459,544 | 10/1995 | Emura | 354/245 |

FOREIGN PATENT DOCUMENTS 0 726 487  8/1996  European Pat. Off. ........ G03B 17/02

OTHER PUBLICATIONS

Patent Abstracts of Japan vol. 16, No. 559 (p–1455) JP–A–04 212945 Nikon Corp, Yoshio, Nov. 1992.
Patent Abstracts of Japan vol. 13, No. 112 (p–844) JP–A–63 287936 Canon Inc, Toyotoshi, Nov. 1988.
Patent Abstracts of Japan No. JP–A–05 212945, published Aug. 4, 1992, vol. 16, No. 559.
Patent Abstracts of Japan No. JP–A–63 287936, published Nov. 25, 1988, vol. 13, No. 112.

Primary Examiner—Safet Metjahic
Assistant Examiner—Christopher Mahoney
Attorney, Agent, or Firm—Robin, Blecker & Daley

[57] ABSTRACT

An apparatus includes a shape memory member, a deforming device which deforms the shape memory member into a predetermined state, an operating device which performs a predetermined movement in response to a movement in which the shape memory member restores itself from the predetermined state to a memorized state, and a restraining device. The restraining device restrains an operation of the deforming device at least when the shape memory member performs the movement of restoring itself from the predetermined state to the memorized state.

27 Claims, 12 Drawing Sheets

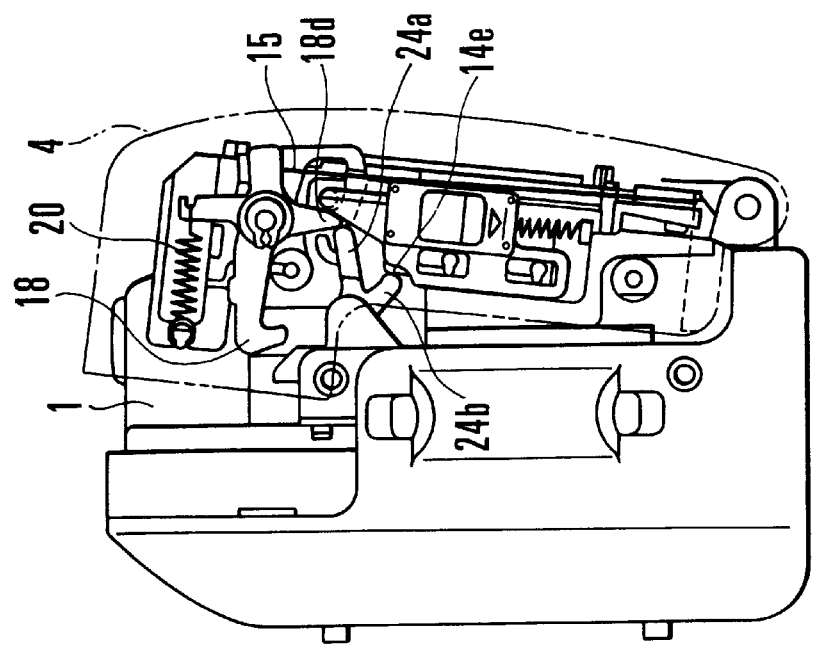
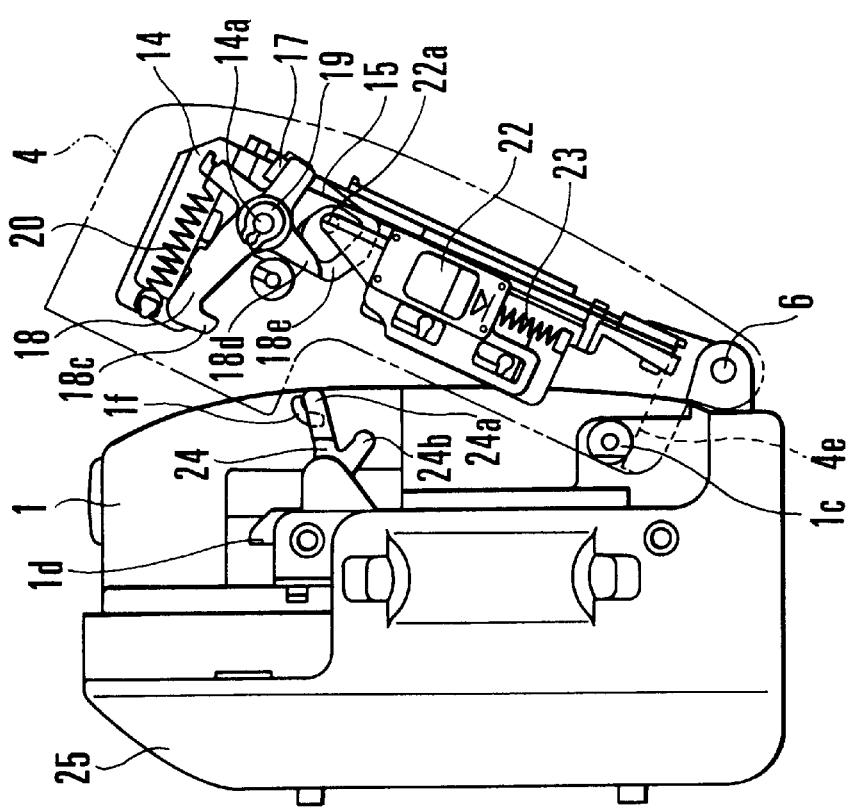

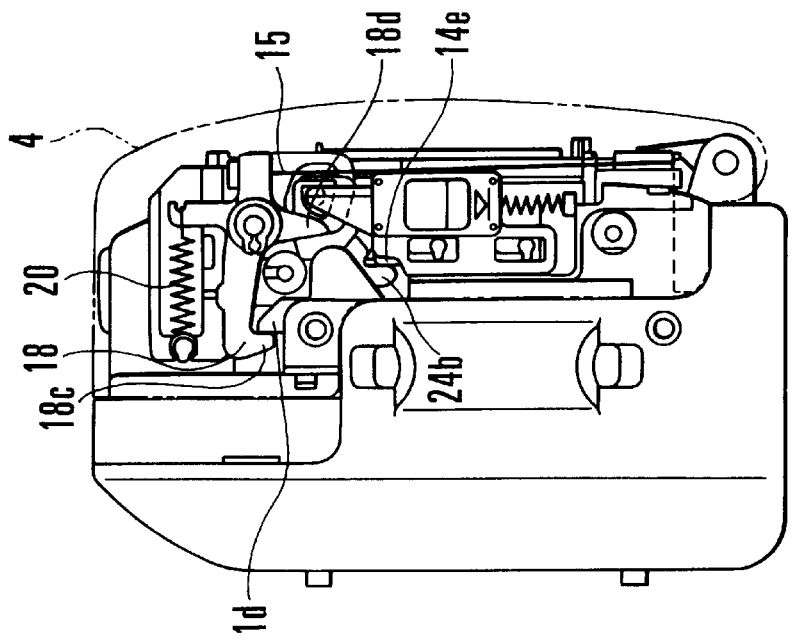

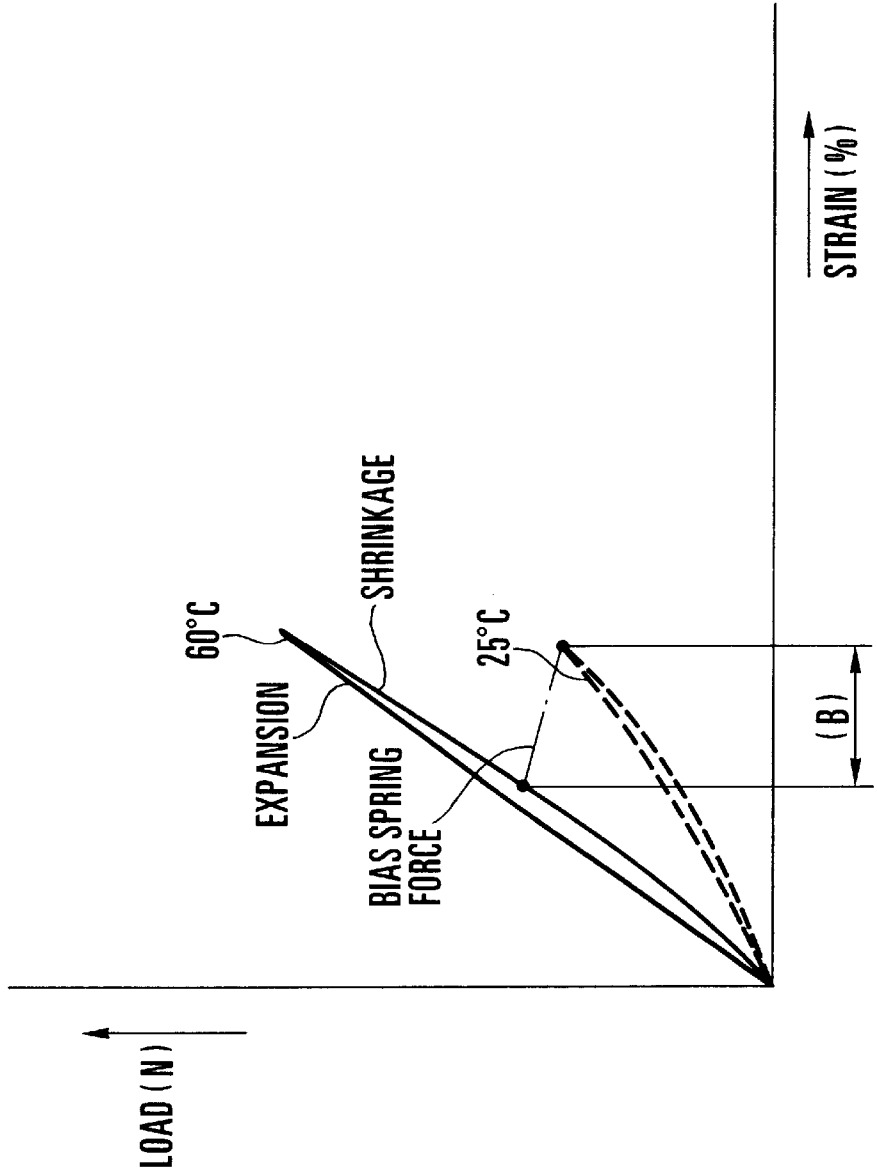

APPARATUS ADAPTED TO USE SHAPE MEMORY MEMBER

BACKGROUND OF THE INVENTION

1. Field of the Invention

The present invention relates to an apparatus, such as a camera, which is adapted to use a shape memory member.

2. Description of the Related Art

A proposal regarding an apparatus adapted to use a shape memory alloy as a shape memory member has been made in Japanese Patent Application No. Hei 7-19175. According to the proposal, such an apparatus includes a first cover provided with a shape memory alloy wire and a second cover provided with a solar battery, and the function of the apparatus is such that when the temperature of the shape memory alloy wire reaches a predetermined temperature, the shape memory alloy wire recovers its shape (shrinkage) and hence the engagement of a latch claw connected to the wire is released, whereby the first and second covers are made to move integrally in a direction away from the body of the apparatus by the force of a spring, thereby producing a space between the body of the apparatus and the first and second covers to prevent overheating of the body of the apparatus.

However, the construction of the above-described proposal presupposes that the shape memory alloy is used at a suppressed strain of 1% or less in the state of small hysteresis (an elasticity area) (if the hysteresis becomes large, the shape memory alloy becomes unable to recover its original shape even if a temperature fall occurs). Accordingly, the shape memory alloy can only provide a small amount of displacement with respect to a variation in the temperature of the shape memory alloy.

For this reason, in the case of a wire-shaped shape memory alloy which can be disposed within a small space in an apparatus, as shown in FIG. 12, the amount of displacement (B) of such shape memory alloy, which is obtainable from the temperature variation thereof, is extremely small the obtainable amount of displacement of a wire of approximately 80 mm long is approximately 0.3 mm, inclusive of a safety margin which ensures that the wire can always be used in the state of small hysteresis). As a result, in the case of the apparatus having the above-described construction, since the amount of engagement of a latch claw cannot be made large at normal temperatures, the first cover may open by a vibration or by a shock due to a fall.

SUMMARY OF THE INVENTION

In accordance with one aspect of the present invention, there is provided an apparatus which comprises a shape memory member, a deforming device which deforms the shape memory member into a predetermined state, an operating device which performs a predetermined movement in response to a movement in which the shape memory member restores itself from the predetermined state to a memorized state, and a restraining device which restrains an operation of the deforming device at least when the shape memory member performs the movement of restoring itself from the predetermined state to the memorized state, so that the shape memory member can correctly restore itself to the memorized state an d the operating device can correctly perform a desired movement.

The above and other objects, features and. advantages of the present invention will become apparent from the following detailed description of preferred embodiments of the present invention, taken in conjunction with the accompanying drawings.

BRIEF DESCRIPTION OF THE DRAWINGS

FIGS. 3(a), 3(b) and 3(c) are diagrammatic side elevational views showing the operation of the camera shown in FIG. 1, FIG. 3(a) representing a state in which a grip cover 4 provided with a shape memory alloy wire 15 is rotated forwardly from a camera body 1, FIG. 3(b) representing a state in which the grip cover 4 is being returned toward the camera body 1, and FIG. 3(c) representing a state in which the grip cover 4 is engaged with the camera body 1;

FIG. 12 is a graph showing the strain-load characteristics of the shape memory alloy wire used in a previously proposed apparatus.

DETAILED DESCRIPTION OF THE PREFERRED EMBODIMENTS

Preferred embodiments of the present invention will be described below in detail with reference to the accompanying drawings.

FIGS. 1 to 6 show a first embodiment of the present invention. The first embodiment relates to an example of a camera to which the present invention is applied, but the range of application of the present invention is not limited to only the camera and encompasses various other apparatuses such as portable telephones, radios and portable computers.

Figure 1:
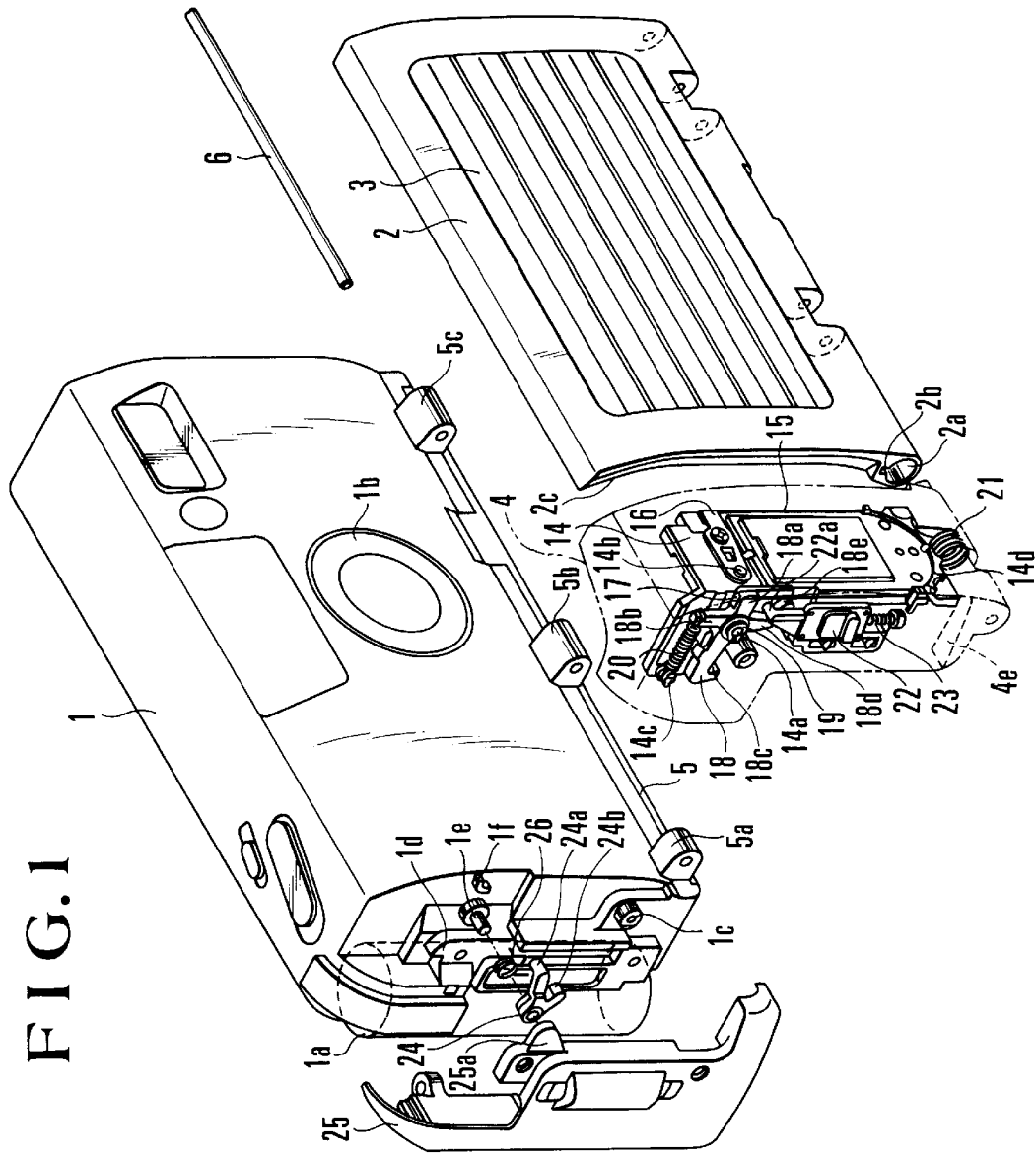
FIG. 1 is an exploded perspective view showing an essential portion of a camera which is an apparatus according to a first embodiment of the present invention.
Figure 2:
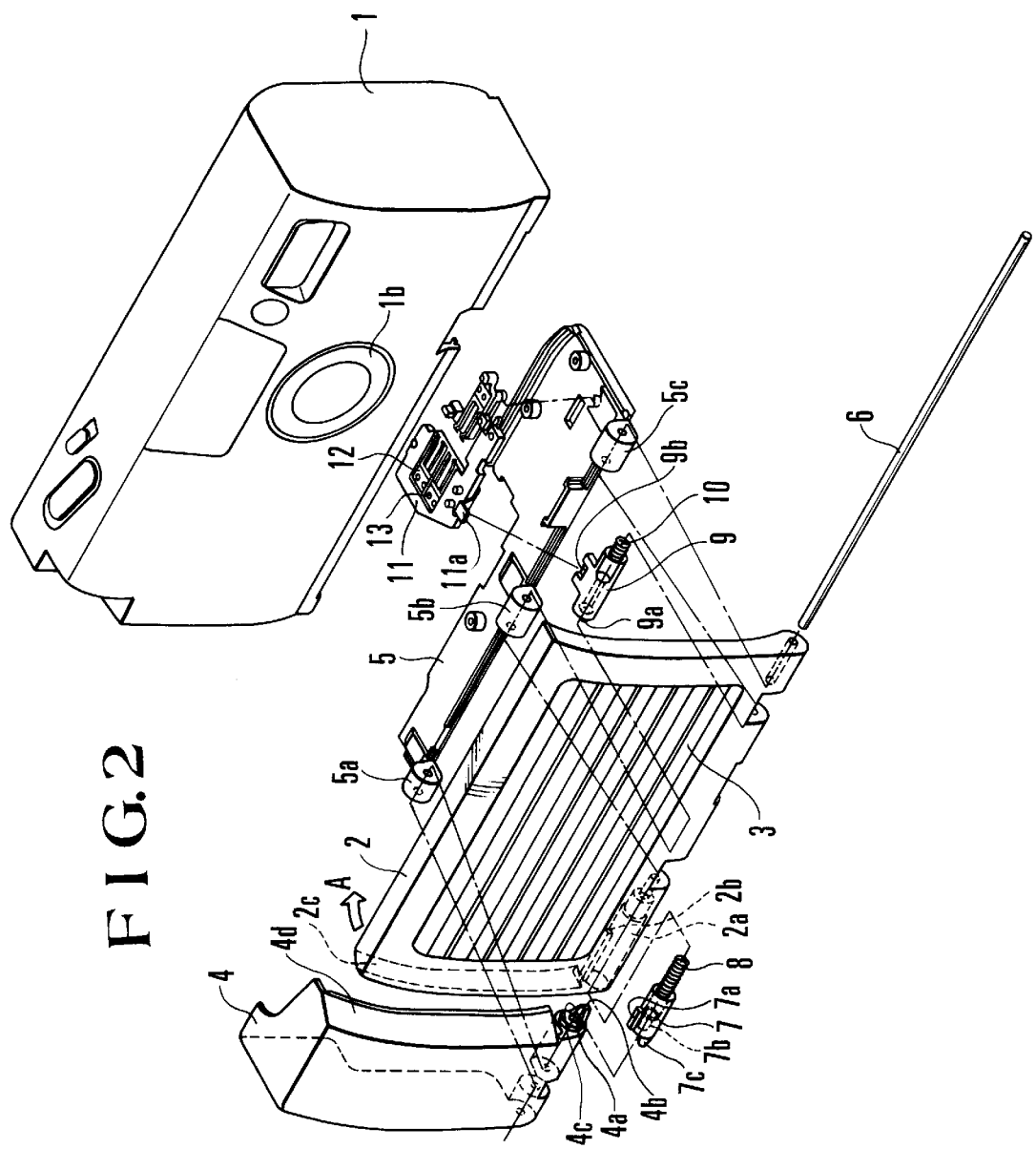
FIG. 2 is an exploded perspective view showing an essential portion of the camera shown in FIG. 1.

FIG. 1 is an exploded perspective view of the camera according to the first embodiment of the present invention, and mainly shows the internal mechanism of a grip cover (first cover). In FIG. 1, the grip cover is represented by two-dot chain lines and the camera is shown in partly transparent form for convenience sake. FIG. 2 is an exploded perspective view of the camera, and mainly shows an arrangement for urging a solar cover (second cover) in a closing direction with respect to the grip cover (first cover). FIGS. 3(a) to 3(c) are side elevational views showing the internal portion of the grip cover in partly transparent form, similarly to FIG. 1. FIG. 3(a) shows a state in which the grip cover is opened as the camera is heated to a high temperature by exposure to the direct rays of the sun. FIG. 3(b) shows a state in which the grip cover is manually being closed after the camera has been air-cooled owing to the opening of the grip cover. FIG. 3(c) shows a state in which the grip cover is completely closed.

Figure 4A:
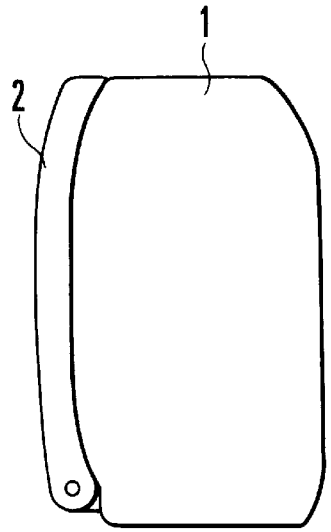
FIGS. 4(a) to 4(c) are schematic side elevational views showing different positions which are taken by a solar cover 2 provided on the camera of FIG. 1 during the movement of the solar cover 2, FIG. 4(a) representing a state in which the camera is not in use, FIG. 4(b) representing a state in which the solar cover 2 is located away from the camera body 1 to prevent overheating of the camera body 1, and FIG. 4(c) representing a state in which photography is possible.
Figure 4B:
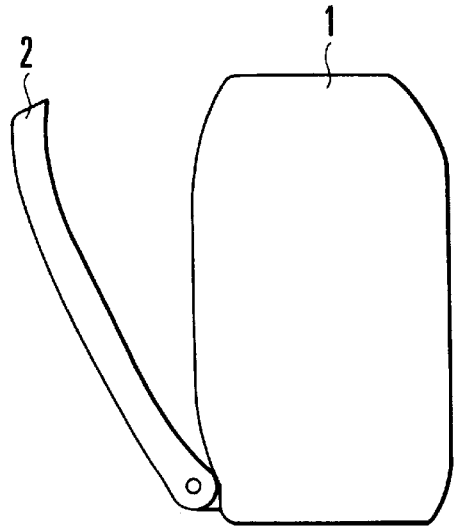
Figure 4C:
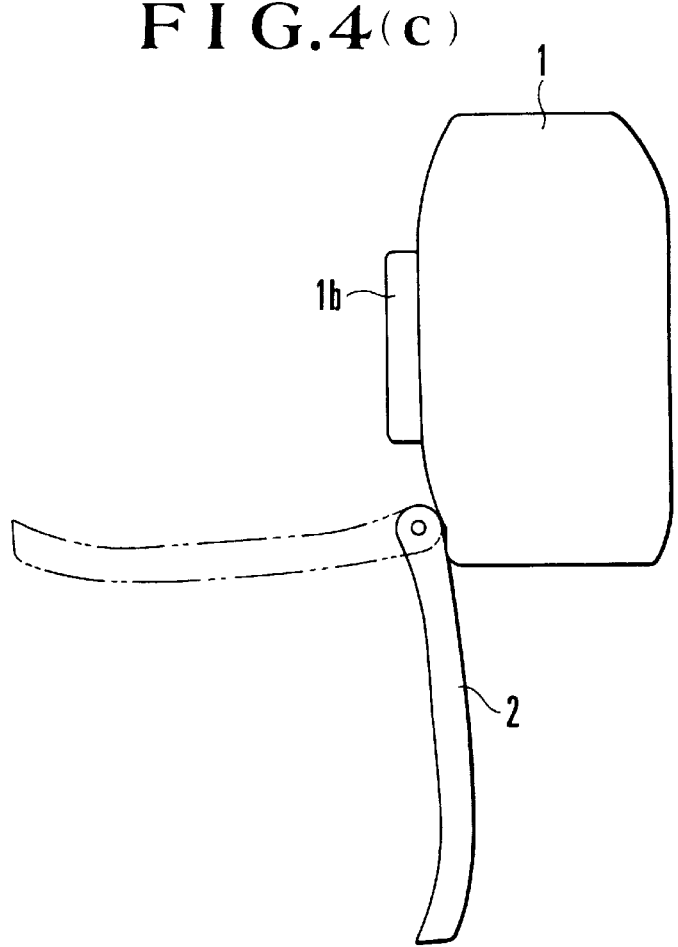

FIGS. 4(a) to 4(c) are schematic side elevational views of the camera. FIG. 4(a) shows a state in which the solar cover is closed so that the user can normally carry the camera. FIG. 4(b) shows a state in which the grip cover is opened as the temperature of the camera rises and the solar cover is also opened in accordance with the opening of the grip cover. FIG. 4(c) shows a photography-enabled state in which the solar cover is independently opened.

Figure 5:
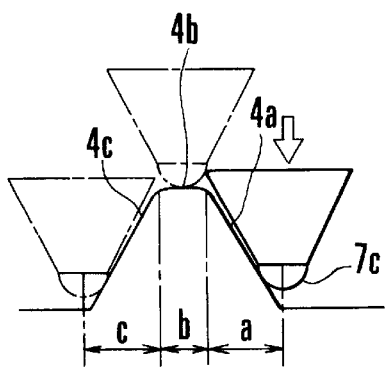
FIG. 5 is a schematic view aiding in explaining the relationship of the relative movement between a cam and a cam follower 7 which allow the grip cover 4 and the solar cover 2 of the camera shown in FIG. 1 to be independently movably joined to each other.
Figure 6:
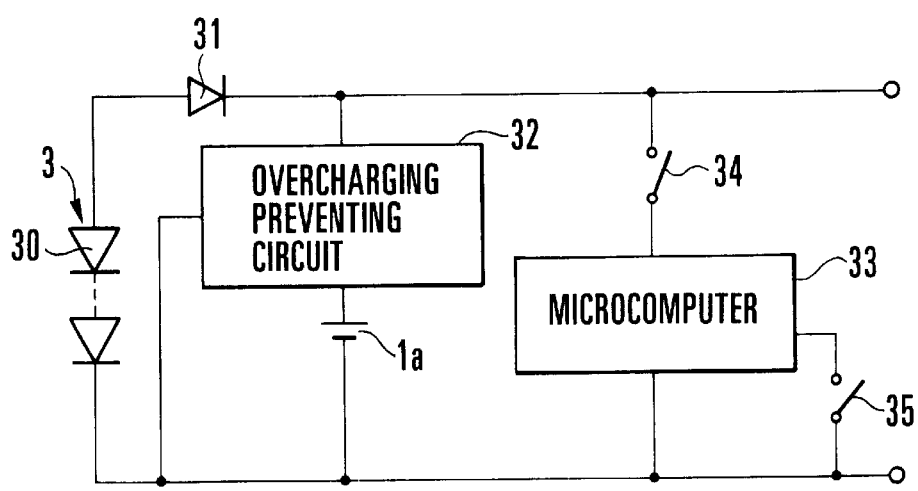
FIG. 6 is a circuit diagram showing one example of a power source circuit portion provided in the camera of FIG. 1.
Figure 7:
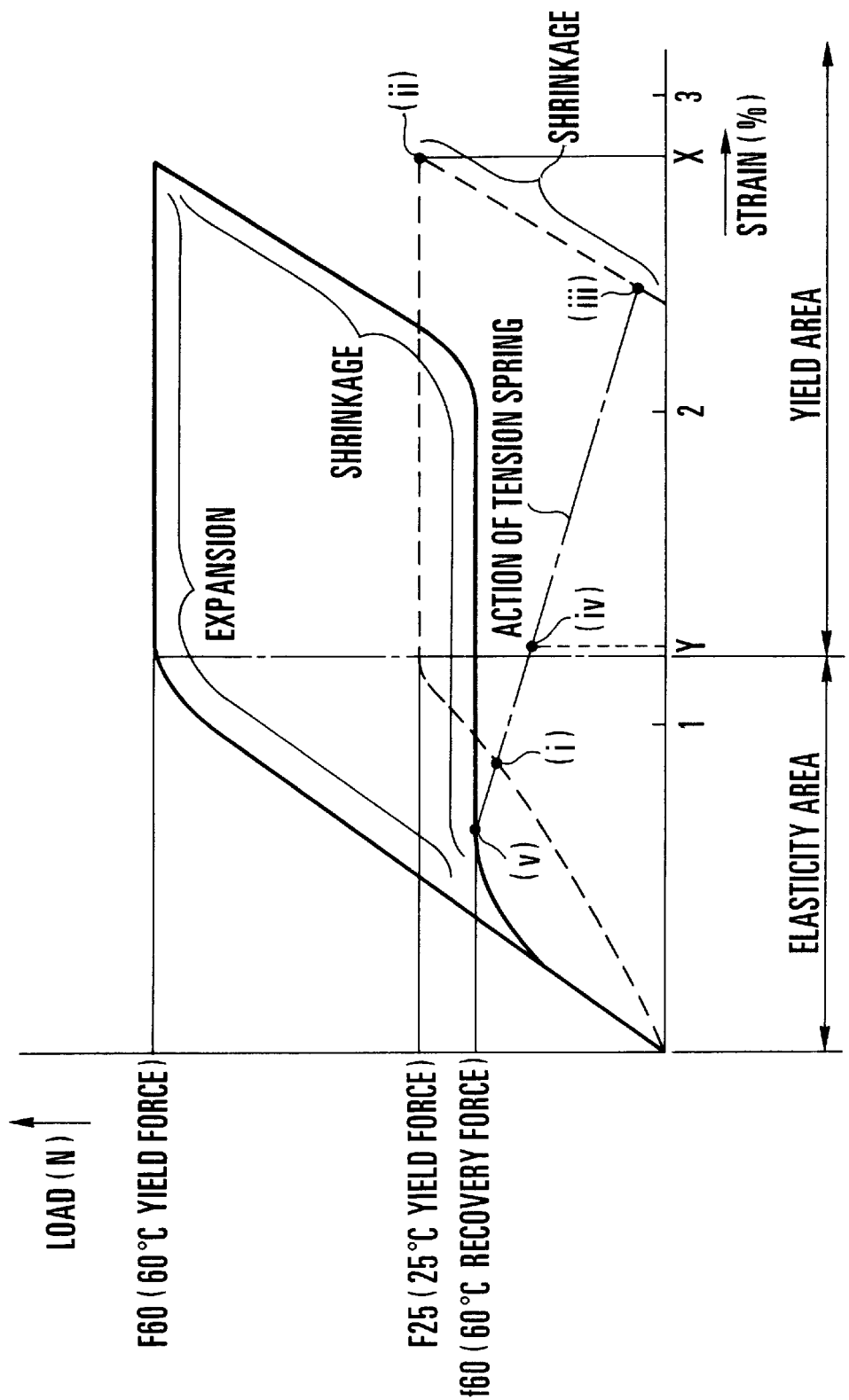
FIG. 7 is a graph showing the relationships among the hysteresis of the shape memory alloy wire 15 of the camera of FIG. 1 before and after the deformation of the shape memory alloy wire 15, the strain of the shape memory alloy wire 15 and the load thereof.

FIG. 5 is an explanatory view of a cam for urging the solar cover (second cover). FIG. 6 is a circuit diagram of the power source portion of the camera. FIG. 7 is a graph showing the strain-load characteristics of a shape memory alloy applied to the camera, and the hysteresis characteristics of expansion and shrinkage at 60° C. are represented by solid lines, while the hysteresis characteristics of expansion and shrinkage at 25° C. are represented by dashed lines. The force with which a wire made of a shape memory alloy is pulled by the action of a tension spring 20 is represented by alternate short and long dash lines.

Referring to FIGS. 1 to 7, a camera body 1 includes a lithium-ion secondary battery 1a provided in built-in form at the position shown in part by solid lines and in part by dashed lines in FIG. 1, and a photographing lens barrel 1b.

Five solar battery cells 3 each of which is made from amorphous material are attached to a solar cover 2 in such a manner as to extend thereon in parallel with one another. The solar cover 2 also has the function of a protection cover for covering a photographing optical system and a viewfinder optical system. As shown in FIG. 6, the solar battery cells 3 are connected in series, and are arranged to supply electrical power to the lithium-ion secondary battery 1a when illuminated with light.

The camera body 1 also includes a grip cover 4 and a bottom cover 5 having hinge portions 5a, 5b and 5c. The solar cover 2, the grip cover 4 and the bottom cover 5 are joined by a hinge shaft 6 fitted in these three components, whereby the solar cover 2 and the grip cover 4 are supported for rotation about the hinge shaft 6. The bottom cover 5 on which the solar cover 2 and the grip cover 4 are supported for rotation about the hinge shaft 6 is fixed to the bottom of the camera body 1 by means of screws. A cam follower 7 is fitted in a hole 2a provided in the solar cover 2, and a key 7a is engaged with a key groove 2b of the solar cover 2 to prevent rotation of the cam follower 7. The cam follower 7 has a through-hole 7b through which the hinge shaft 6 is inserted in such a manner that the cam follower 7 can rotate and axially slide with respect to the hinge shaft 6. A compression spring 8 has an urging force which acts to press a cam abutment portion 7c of the cam follower 7 against cam faces 4a to 4c integrally provided on the grip cover 4. The compression spring 8 is accommodated in the hole 2a of the solar cover 2 together with the cam follower 7. When the solar cover 2 is placed in its closed position (the state shown FIG. 4(a)), the cam abutment portion 7c of the cam follower 7 is pressed against the cam face 4a, whereby the solar cover 2 is urged in a closing direction (the direction indicated by an arrow A in FIG. 2) with respect to the grip cover 4 and an oblique face 2c of the solar cover 2 is maintained in abutment with an oblique face 4d of the grip cover 4. A switch actuating member 9 is axially slidably fitted on the hinge shaft 6 similarly to the cam follower 7. A compression spring 10 has an urging force which acts to press a cam abutment portion 9a of the switch actuating member 9 against a cam face (not shown) integrally provided on the solar cover 2. The switch actuating member 9 is arranged to move toward the right as viewed in FIG. 2 in accordance with the opening movement of the solar cover 2 and toward the left by the spring force of the compression spring 10 in accordance with the closing movement of the solar cover 2. A switch plate 11 has contacts 12 and 13 retained by heat caulking, and is arranged to move toward the right and the left integrally with the switch actuating member 9 with an engagement portion 11a being engaged with a recess portion 9b of the switch actuating member 9. The contacts 12 and 13 are in contact with the pattern of a printed wiring board (not shown), and are operative to turn on or off a power source according to the rightward or leftward movement of the switch plate 11. The contacts 12 and 13 constitute a microcomputer activating switch 34 and a main switch 35, both of which are shown in FIG. 6.

A mechanism which is disposed inside the grip cover 4 will be described below. The mechanism includes a grip base plate 14 and a shape memory alloy wire 15 made of Ni—Ti, and the shape memory alloy wire 15 is fastened at one end to an adjustment plate 16 by caulking and at the other end to a cylindrical collar 17 by caulking. A latch claw 18 is supported for rotation about a shaft 14a of the grip base plate 14, and is retained by a grip ring 19 so as not to come off the shaft 14a.

The collar 17 to which the shape memory alloy wire 15 is fastened at one end is engaged with a recess provided in an arm 18a of the latch claw 18, and the shape memory alloy wire 15 is passed along an arc-shaped rib 14d of the grip base plate 14 in the vicinity of the inside face of the grip cover 4. The adjustment plate 16 to which the shape memory alloy wire 15 is fastened at the other end by caulking is supported for rotation about a shaft 14b of the grip base plate 14. The adjustment plate 16 is fixed to the grip base plate 14 by a screw after the tension of the shape memory alloy wire 15 has been adjusted. The tension spring 20 is disposed between an arm 18b of the latch claw 18 and a dowel 14c of the grip base plate 14 to urge the latch claw 18 in the counterclockwise direction.

The grip base plate 14 having the above-described mechanism is held on the back and side faces of the grip cover 4 by screws (not shown). A torsion spring 21 serves to urge the grip cover 4 to open in a direction away from the camera body 1. Normally, a user carries the camera with a claw portion 18c of the latch claw 18 being held in engagement with a claw engagement portion 1d of the camera body 1 by the charged urging force of the torsion spring 21, i.e., with the grip cover 4 being closed in the state shown in FIG. 3(c). If the camera is exposed to intense sunlight, the temperatures of the solar battery cells 3 and the grip cover 4 become higher, so that the shape memory alloy wire 15 is deformed and shrinks to its memorized length. Thus, the latch claw 18 is made to turn in the clockwise direction against the spring force of the tension spring 20, whereby the claw portion 18c disengages from the claw engagement portion 1d of the camera body 1. When the claw portion 18c disengages from the claw engagement portion 1d, the grip cover 4 opens by the spring force of the torsion spring 21, and is made to stop when a rib 4e integrally provided on the inside of the grip cover 4 comes into abutment with a dowel 1c of the camera body 1 and the opening angle of the grip cover 4 reaches approximately 25° (the state shown in FIG. 3(a)).

A manual release knob 22 is provided on the side face of the grip cover 4 in such a manner as to be slidable upward and downward. When the user slides the manual release knob 22 downward against the urging force of a compression spring 23, an arm 18e of the latch claw 18 rotates by being pressed by a shaft 22a of the manual release knob 22, so that the claw portion 18c can be disengaged from the claw engagement portion 1a of the camera body 1.

A pulling mechanism for the shape memory alloy wire 15 which constitutes one feature of the present apparatus will be described below. A V-shaped lever 24 is supported for rotation about a shaft 1e provided on a side of the camera body 1. The V-shaped lever 24 is prevented from coming off the shaft 1e, by a lever pressing tongue 25a of a battery cover 25 which covers the lithium-ion secondary battery 1a. The battery cover 25 is attached to the side of the camera body 1 by a screw (not shown). The torsion spring 26 serves to urge the V-shaped lever 24 in the counterclockwise direction, and when the grip cover 4 is opened, one arm end 24a of the V-shaped lever 24 is positioned in abutment with a projection 1f of the camera body 1 (the state shown in FIG. 3(a)).

FIG. 6 is a block diagram showing the power source portion of a circuit suited to the present apparatus (the camera). The power source portion includes a solar battery 30, the lithium-ion secondary battery 1a, a diode 31 for preventing a reverse current, a known overcharging preventing circuit 32, a microcomputer 33 for controlling the camera body 1, the microcomputer activating switch 34 which is turned on when the solar cover 2 is made open, and the main switch 35 which is arranged to be turned on immediately after the main switch 34 has been turned on. Specifically, in the power source portion, a power-saving circuit construction is realized in that even the supply of electrical power to the microcomputer 33 is shut off when the apparatus (the camera) is not in use.

The operation of the camera having the above-described construction will be described below. Normally, the user carries the camera with the solar cover 2 and the grip cover 4 being closed as shown in FIGS. 3(c) and 4(a), so that the solar battery cells 3 are exposed to external light to charge the lithium-ion secondary battery 1a with electricity. When the solar cover 2 and the grip cover 4 are in their closed states, the shape memory alloy wire 15 is expanded by the pulling mechanism for the shape memory alloy wire 15 which will be described later, and the latch claw 18 is engaged with the claw engagement portion 1d of the camera body 1. In addition, the cam abutment portion 7c of the cam follower 7 fitted in the solar cover 2 is pressed by the cam face 4a of the grip cover 4, whereby the solar cover 2 is urged in the closing direction.

As the solar cover 2 urged in this manner is opened by hand for the purpose of photography, the cam abutment portion 7c climbs up the cam face 4a while charging the compression spring 8, as shown in FIG. 5. When the cam abutment portion 7c is located in an area "a" of FIG. 5, an urging force is applied to the solar cover 2 in the closing direction. When the cam abutment portion 7c is located in an area "b", no urging force is applied to the solar cover 2 in either of the opening and closing directions (the state shown by dashed lines in FIG. 4(c)). When the cam abutment portion 7c enters an area "c", a force which urges the solar cover 2 in the opening direction is produced. Accordingly, the fluctuation of the solar cover 2 is suppressed even when the solar cover 2 is located at a photographing position where it is fully opened. As the solar cover 2 is opened, the switch actuating member 9 climbs up a cam face (not shown) integrally provided on the solar cover 2 while charging the compression spring 10, and travels toward the right as viewed in FIG. 2 and turns on the microcomputer activating switch 34 and then the main switch 35 in accordance with a switching pattern of the printed wiring board which is in contact with the contact 12. When the main switch 35 is turned on, the photographing lens barrel 1b moves forward from its barrel-retracted state to its photography standby position, as shown in FIG. 4(c), so that photography becomes possible. Contrarily, as the solar cover 2 is closed, the switch actuating member 9 travels toward the left by the spring force of the compression spring 10 and the main switch 35 is turned off, whereby the photographing lens barrel 1b is retracted. Even during the aforesaid movement of the solar cover 2 for the purpose of photography, the grip cover 4 is maintained in the closed state with respect to the camera body 1.

The following description is made in connection with the operation of the aforesaid camera which is capable of coping with a temperature rise which may occur while the user is charging the secondary battery of the camera in direct sunshine.

According to the experiment made by the present inventor, it has been found out that the temperature of the interior of a vehicle which is parked in fine weather in an area near to the equator (for example, Malaysia) reaches approximately 90° at or near the dashboard and the average air temperature of the interior reaches as high as 52° C.

If the camera is placed in such an environment in the state shown in FIG. 4(a), the temperature of the solar battery cells 3 of the solar cover 2 will rise above 90° C. in approximately one hour, and the temperature of the air layer between the solar cover 2 and the camera body 1 and that of the front face of the camera body 1 will rise to an excessively high temperature of approximately 85° C. (Since the thickness of the air layer can only be made as large as approximately several millimeters in terms of portability, the speed at which a convection current of fresh air flows in the air layer is restricted to only several millimeters per second owing to the viscous resistance of air to the back face of the solar cover 2 and the front face of the camera body 1. For this reason, when the camera is in the state of FIG. 4(a), the effect of cooling the back face of the solar cover 2 is low.) As a result, not only will the components of the camera body 1 be damaged, but also the temperature of the aforesaid lithium-ion secondary battery 1a will rise above 65° C., and the temperature of film may also rise above 60° C.

The present apparatus has a function which is capable of preventing occurrence of the above-described overheated state.

If the camera is placed in direct sunshine in the states shown in FIGS. 3(c) and 4(a), the temperatures of the solar cover 2 and the grip cover 4 as well as the temperature of the solar battery cells 3 rise. Particularly when the camera is exposed to a severe environment such as the aforementioned one, the temperature of the grip cover 4 becomes equal to or higher than 60° C. in approximately twenty minutes. Then, the shape memory alloy wire 15 made of Ni—Ti is deformed and shrinks to cause the latch claw 18 to turn in the clockwise direction against the spring force of the tension spring 20, thereby disengaging the claw portion 18c from the claw engagement portion 1d of the camera body 1. Then, the grip cover 4 is opened by an opening angle of approximately 25° by the spring force of the torsion spring 21, so that the rib 4e of the grip cover 4 comes into abutment with the dowel 1c (the state shown in FIG. 3(a)). With the opening movement of the grip cover 4, the oblique face 4d of the grip cover 4 presses the oblique face 2c of the solar cover 2 upwardly, so that the solar cover, 2 is also opened by an opening angle equal to that of the grip cover 4 (the state shown in FIG. 4(b)). Since the solar cover 2 is urged via the cam follower 7 in the closing direction with respect to the grip cover 4, the torsion spring 21 needs only have a sufficient force to press the grip cover 4 and the solar cover 2 upwardly. When the camera is in the state shown in FIGS. 3(a) and 4(b), the air layer between the solar cover 2 and the camera body 1 becomes not less than 15 mm thick (with respect to the original several millimeters), so that the solar cover 2 and the front face of the camera body 1 are cooled by the convection current of fresh air (a maximum of 52° C.). In particular, the temperature of the front face of the camera body 1, which is covered with the shades of the solar cover 2 and the grip cover 4 which have been popped up, falls to a temperature approximately equal to the air temperature of the interior of the vehicle. In addition, since the solar battery cells 3 continue to absorb the energy of the sunshine, the temperature of the solar cover 2 rises to a further extent, but does not exceed the aforementioned 90° C., because the back face of the solar cover 2 is cooled by fresh air.

In addition, the lithium-ion secondary battery 1a which is easily affected by high temperatures is disposed in the camera body 1 in an area thereof which can be covered with the shade of the grip cover 4, so that even if the user erroneously places the camera under the light of the sun with the solar cover 2 being fully open, the outside portion of the camera body 1 which is adjacent to the lithium-ion secondary battery 1a built therein is prevented from being exposed to the direct rays of the sun. Accordingly, the lithium-ion secondary battery 1a behind that outside portion is prevented from being heated to a high temperature. In addition, since film is laid in a back portion of the camera body 1, the temperature of the film only rises to a practically allowable temperature (experimentally, approximately 45° C.), so that the film practically does not suffer any problem.

Even after the camera has been left in the above-described environment for several days, if the user does not forget to carry the camera out of the vehicle, fresh air (in many cases, 40° C. or less) flows into the space between the camera body 1 and the solar cover 2 which is located away from the camera body 1 in the popped-up state, and rapidly cools the shape memory alloy wire 15.

When the temperature of the shape memory alloy wire 15 falls below 55° C., the shape memory alloy wire 15 is restored to the original state and the tension of the shape memory alloy wire 15 lowers.

As shown in the graph of FIG. 7, even if the temperature falls to 25° C. (normal temperature) and the tension of the shape memory alloy wire 15 lowers, since the acting force of the tension spring 20 hooked on the latch claw 18 is set to be lower than a yield force F25 of the shape memory alloy wire 15 at 25° C., the shape memory alloy wire 15 cannot be pulled to a great extent by the force of the tension spring 20, with the result that the shape memory alloy wire 15 cannot be expanded up to a yield area in which the amount of engagement of the latch claw 18 with the claw engagement portion 1d can be made large.

In contrast, if the force of the tension spring 20 is designed to be stronger than the yield force F25, the tension spring 20 may produce a spring force stronger than a recovery force f60 at 60° C., with the result that the latch claw 18 cannot be actuated at 60° C. and the engagement of the latch claw 18 is not released before the temperature of the shape memory alloy wire 15 reaches a higher temperature (for example, 80° C.). In other words, if the difference between the normal temperature (25° C.) and an operating temperature (in the present embodiment, 60° C.) is small, the above-described problem will occur. To solve the problem, the present embodiment is arranged so that the force of the tension spring 20 is set to be lower than the yield force F25 and the shape memory alloy wire 15 can be pulled and deformed to a great extent by the pulling mechanism for the shape memory alloy wire 15 which is interlocked with the closing movement of the grip cover 4.

In use, if heat radiation is completed during the opened state of the grip cover 4, the grip cover 4 is necessarily closed by the user so that the camera is changed into a portable form or a form suited to photography. Specifically, the camera is used in accordance with the sequence of battery charging due to sunlight→temperature rise of camera→opening of grip cover→temperature fall of camera closing of grip cover→carrying of camera or execution of photography→battery charging due to sunlight. By incorporating the operation of pulling (deforming) the shape memory alloy wire into the aforesaid use sequence of the camera, it is possible to solve the above-described problem.

The following description is made in connection with the operation of closing the grip cover 4 which is in the opened state as shown in FIG. 3(a). First, when the grip cover 4 is rotated about the hinge shaft 6 in the closing direction against the opening force of the torsion spring 21 by hand, an arm 18d of the latch claw 18 comes into abutment with the arm end 24a of the V-shaped lever 24. When the grip cover 4 is rotated to a further extent, since the V-shaped lever 24 is maintained in abutment with the projection 1f of the camera body 1, the latch claw 18 is rotated in the counterclockwise direction by the rotation of the grip cover 4 in the closing direction. Accordingly, the shape memory alloy wire 15 is pulled and expanded up to the yield area. When the grip cover 4 continues to be rotated in the closing direction, an end face 14e of the grip base plate 14 comes into abutment with an arm 24b of the V-shaped lever 24 and the V-shaped lever 24 starts to rotate in the clockwise direction against the urging force of the torsion spring 26. The amount of pulling of the shape memory alloy wire 15 reaches a maximum when the arm 18d of the latch claw 18 and the arm end 24a of the V-shaped lever 24 are brought into abutment with each other at right angles (as shown in FIG. 3(b)). After that state, the arm end 24a of the V-shaped lever 24 moves away from the arm 18d of the latch claw 18 in accordance with the rotation of the grip cover 4. As shown in FIG. 3(c), when the grip cover 4 is fully closed, the claw portion 18c of the latch claw 18 is engaged with the claw engagement portion 1d of the camera body 1 and the arm end 24a of the V-shaped lever 24 is located at a position where it does not interfere with the unlatching movement of the latch claw 18 (i.e., the clockwise rotating movement of the latch claw 18 when the temperature of the shape memory alloy wire 15 rises to a high temperature). The above-described operation will be described with reference to the graph of FIG. 7. The process through which the latch claw 18 rotates in the counterclockwise direction and pulls and expands the shape memory alloy wire 15 corresponds to the portion from a point (i) at which the shape memory alloy wire 15 balances the acting force of the tension spring 20 to a point (ii) at which the shape memory alloy wire 15 is expanded by the 25° C. yield force F25. "X" represents the maximum strain of the shape memory alloy wire 15 and corresponds to the state shown in FIG. 3(b). As the V-shaped lever 24 moves away from the latch claw 18, the shape memory alloy wire 15 naturally shrinks until it balances the acting force of the tension spring 20 (the portion from the point (ii) to a point (iii)). At this time, the grip cover 4 is fully closed and the latch claw 18 is brought into engagement with the claw engagement portion 1d of the camera body 1 (FIG. 3(c)). If a temperature rise occurs at the point (iii) and the shape memory alloy wire 15 passes through an engagement release position Y relative to the latch claw 18 and performs recovery of its shape (reduction of the strain), the grip cover 4 opens. A remarkable variation of the strain appears in the vicinity of a transformation point (55° C.), so that the shrinkage of the shape memory alloy wire 15 at temperatures of 25° C. to 50° C. is extremely small. If the temperature of the shape memory alloy wire 15 rises to 60° C., the latch claw 18 is rotated in the clockwise direction in accordance with the shrinkage of the shape memory alloy wire 15, thereby pulling the tension spring 20 (the point (iii)→a point (iv)→a point (v)).

After that, when the shape memory alloy wire 15 cools to 25° C., it returns to the point (i) at which the shape memory alloy wire 15 balances the tensile load of the tension spring 20. Accordingly, even if the shape memory alloy wire 15 is pulled to a great extent up to the yield area and is deformed so that the amount of engagement of the latch claw 18 with the claw engagement portion 1d can be made large, the force required for such deformation does not act on the shape memory alloy wire 15 during the recovery of the shape thereof, so that the engagement of the latch claw 18 can be released.

Although the above description of the present embodiment has referred to a wire-shaped shape memory alloy which can be incorporated into a small space, it is a matter of course that the present invention can also be applied to a coil spring-shaped shape memory alloy capable of providing a far larger amount of displacement.

Figure 8:
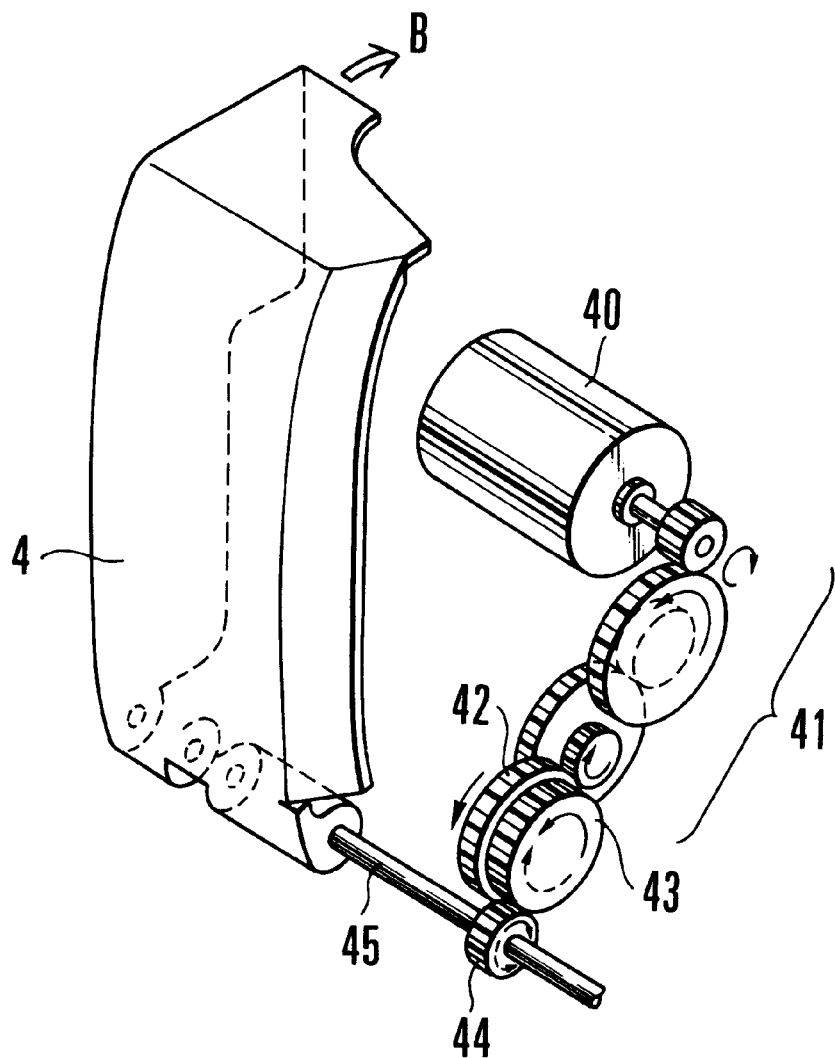
FIG. 8 is a perspective view of an essential portion of a camera according to a second embodiment of the present invention having a driving arrangement for both giving strain to the shape memory alloy wire 15 by power driving and power-driving the grip cover 4 in a closing direction.
Figure 9:
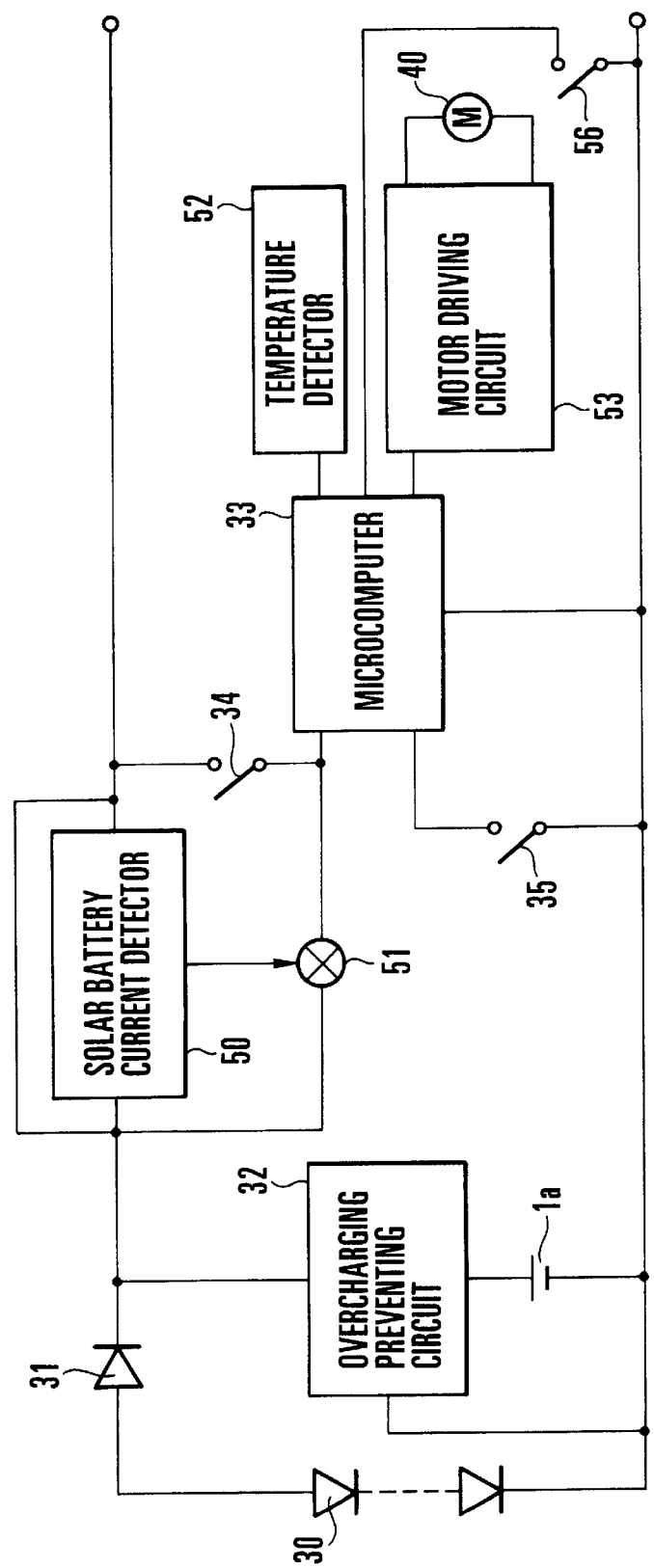
FIG. 9 is a circuit diagram of one example of a power source circuit portion of the camera shown in FIG. 8.

The following description is made in connection with a second embodiment of the present invention which is arranged to deform a shape memory alloy wire by pulling it while closing a grip cover by the action of a motor. The construction of the second embodiment is substantially identical to that of the first embodiment, and only different constituent elements of the second embodiment are shown in FIG. 8. FIG. 8 is a schematic view showing a speed reduction mechanism which closes the grip cover 4 by using a motor built in the camera body 1 as a driving source. FIG. 9 is a circuit diagram of a circuit suited to the second embodiment. The speed reduction mechanism shown in FIG. 8 includes a motor 40 which serves as a driving source, a gear train 41 for transmitting the rotation of the motor 40, gears 42 and 43 which are separate constituent elements each of which contains part of a known one-way clutch mechanism, a gear 44 integrally fixed to a driving shaft 45 and meshed with the gear 43. The grip cover 4 and the driving shaft 45 are integrally fixed to each other so that they are prevented from producing a relative rotation. In operation, when the rotation of the motor 40 is transmitted as shown by solid arrows in FIG. 8 with the grip cover 4 opened, the grip cover 4 rotates in the closing direction (in the direction indicated by an arrow B). At this time, the pulling action described previously in connection with the first embodiment is applied to the shape memory alloy wire 15, and after a large tensile deformation has been imparted to the shape memory alloy wire 15, the claw portion 18c of the latch claw 18 engages with the claw engagement portion 1d of the camera body 1. Contrarily, when the shape memory alloy wire 15 shrinks by being heated to a high temperature similarly to the case of the first embodiment and the engagement of the latch claw 18 with the claw engagement portion 1d is released, the grip cover 4 opens by the force of the torsion spring 21. Then, the gear 44 and the driving shaft 45 integrally fixed to the grip cover 4 rotate in the direction of the arrow shown on the gear 44 by a dashed line in FIG. 8, and the gear 43 also rotates. The gear 42, which is directly coupled to the motor 40, does not rotate, while the gear 43 rotates while slipping on the gear 42 by the action of the one-way clutch mechanism (not shown). In other words, the rotation opposite to the rotation of the motor 40 indicated by the solid-line arrow can be used also as a driving source for driving another mechanism of the camera (for example, zooming or film transport).

FIG. 9 is a block diagram of a circuit suited to the present embodiment. In FIG. 9, identical reference numerals are used to denote constituent elements identical to those shown in FIG. 6, and the description thereof is omitted. In FIG. 9, reference numeral 50 denotes a solar battery current detector, and reference numeral 51 denotes an analog switch which performs a switching operation according to the current value detected by the solar battery current detector 50. Although the system described previously as the first embodiment is arranged so that only when the solar cover 2 is opened, the microcomputer activating switch 34 is turned on to perform control of the function of each part of the camera, the second embodiment is arranged so that the analog switch 51 is automatically turned on even when the current value detected by the solar battery current detector 50 exceeds a predetermined value. Specifically, if the camera is placed in sunlight of high illumination intensity, the microcomputer 33 is activated. A temperature detector 52 and a motor driving circuit 53 are controlled by the microcomputer 33. A cover switch 56 is provided for detecting the closed state of the grip cover 4, and the on/off state of the cover switch 56 is detected by the microcomputer 33.

The operation of the above-described construction and arrangement will be described below with reference to FIG. 10 which shows a flowchart of the microcomputer 33.

First of all, the solar battery 30 generates electrical power by exposure to light irrespective of whether the grip cover 4 is opened, thereby charging the lithium-ion secondary battery 1a with electricity.

Even if the microcomputer 33 is not in operation, the current value of the electrical power generated by the solar battery 30 is detected by the solar battery current detector 50. If the solar battery current detector 50 detects a current value I greater than a predetermined current value $I_0$, the solar battery current detector 50 turns on the analog switch 51 and activates the microcomputer 33. Thus, the microcomputer 33 starts its operation with Step S1 to be described below. In other words, if the camera is placed in such intense light that the grip cover 4 is heated to a high temperature and is popped up, the solar battery 30 generates electrical power because of the high illumination intensity, and the solar battery current detector 50 detects the current of the solar battery 30, turns on the analog switch 51 and activates the microcomputer 33.

[Step S1] It is determined whether the cover switch 56 is on (the grip cover 4 is closed) or off (the grip cover 4 is opened). If the cover switch 56 is on, the process proceeds to Step S8; otherwise, the process proceeds to Step S2.

[Step S8] After a predetermined time is counted, the process proceeds to Step S9.

[Step S9] The number of times by which this routine has been repeated is counted.

[Step S10] If the off state of the cover switch 56 is detected five times, the process proceeds to Step S7. If the off state of the cover switch 56 has not yet been detected up to five times, the process returns to Step S1, in which the state of the cover switch 56 is detected. Specifically, after the opened state of the grip cover 4 has been detected, the process proceeds to a flow for a closing operation.

[Step S2] A temperature "t" at a predetermined location of the camera is detected by the temperature detector 52, and the process proceeds to Step S3. [Step S3] A preset temperature t0 and the detected temperature "t" are compared. If the detected temperature "t" is lower than the set temperature t0, the process proceeds to Step S4. If the detected temperature "t" is equal to or higher than the set temperature t0, the process returns to Step S2, in which the detection of the temperature "t" is repeated.

[Step S4] The motor 40 is energized to rotationally drive the speed reduction gears 41 to 44, thereby executing the closing operation of the grip cover 4.

[Step S5] It is determined whether the cover switch 56 is on or off. If the on state of the cover switch 56 is detected (the grip cover 4 is closed), the process proceeds to Step S6, whereas if the off state of the cover switch 56 is detected, the energization of the motor 40 of Step S4 is continued.

[Step S6] When the closing operation of the grip cover 4 is completed, the motor 40 is deenergized.

[Step S7] The microcomputer 33 stops the operation and brings this flow to an end.

Specifically, after the grip cover 4 is heated to a high temperature and is popped up, if the temperature of the camera lowers owing to heat radiation, a fall in outside air temperature, interruption of illumination with sunlight or the like and it is detected through the temperature detector 52 that the temperature of the camera has become a temperature lower than a predetermined temperature, the microcomputer 33 causes the motor driving circuit 53 to energize the motor 40 and closes the grip cover 4 via the gear train shown in FIG. 8.

Figure 11:
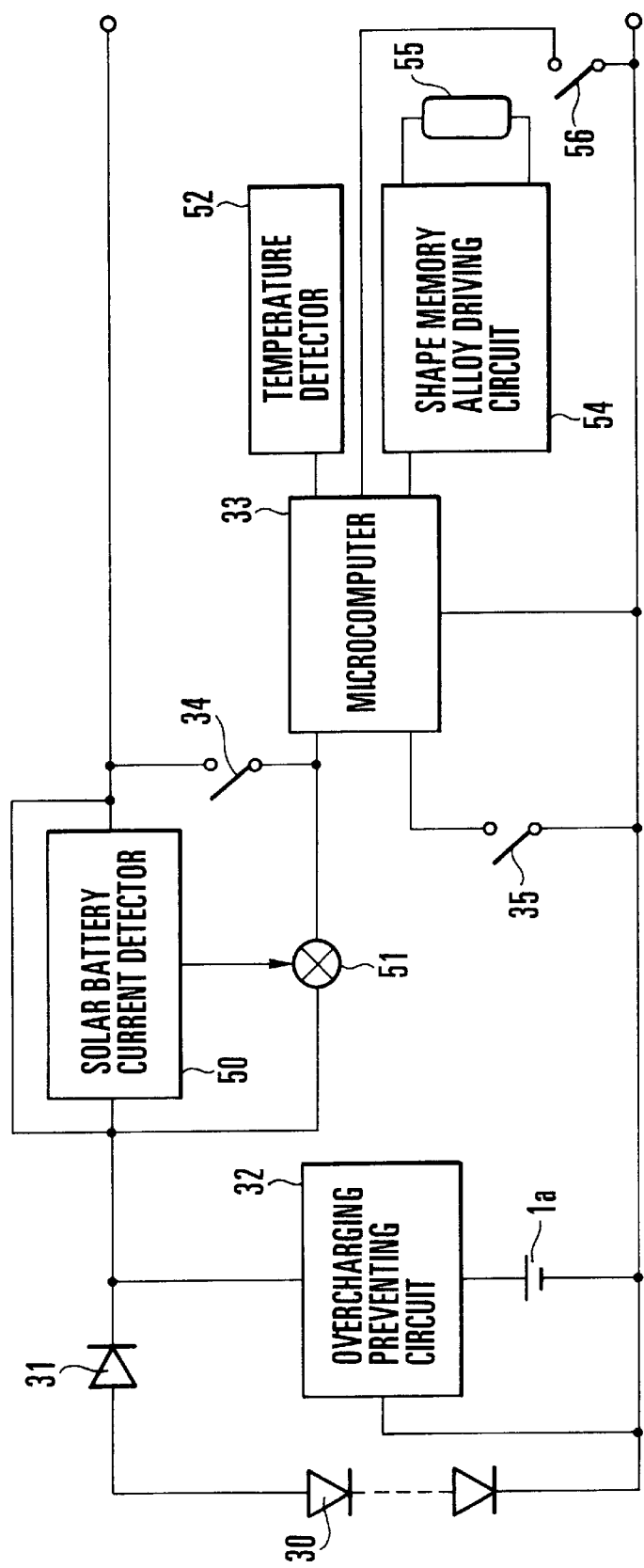
FIG. 11 is a circuit diagram showing a third embodiment of the present invention which is a partial modification of the circuit shown in FIG. 9.

FIG. 11 is a circuit diagram showing a third embodiment which is suited to an apparatus in which a shape memory alloy spring is used as a power source in place of the motor used in the second embodiment described above. In FIG. 11, identical reference numerals are used to denote constituent elements identical to those shown in FIG. 9, and the description thereof is omitted.

Similarly to the second embodiment, after the grip cover 4 is popped up, if the camera cools and the temperature detector 52 detects a temperature lower than a predetermined temperature, the microcomputer 33 causes a shape memory alloy driving circuit 54 to energize a shape memory alloy spring 55. The shape memory alloy spring 55 is deformed and shrinks by self-heating due to the energization, thereby closing the grip cover 4.

The shape memory alloy spring 55 is hooked between the grip cover 4 and the camera body 1. When the shape memory alloy spring 55 is energized, a tension (the shape recovery force of the shape memory alloy spring 55) works as a force stronger than the force of the torsion spring 21 for opening the grip cover 4. The transformation temperature of the shape memory alloy spring 55 is set higher than that of the shape memory alloy wire 15 which is used for releasing the engagement of the latch claw 18 with the claw engagement portion 1d. Accordingly, if the temperature of the camera rises during battery charging and the shape memory alloy wire 15 performs recovery of the shape, the recovery of the shape of the shape memory alloy spring 55 does not occur during that of the shape memory alloy wire 15.

Figure 10:
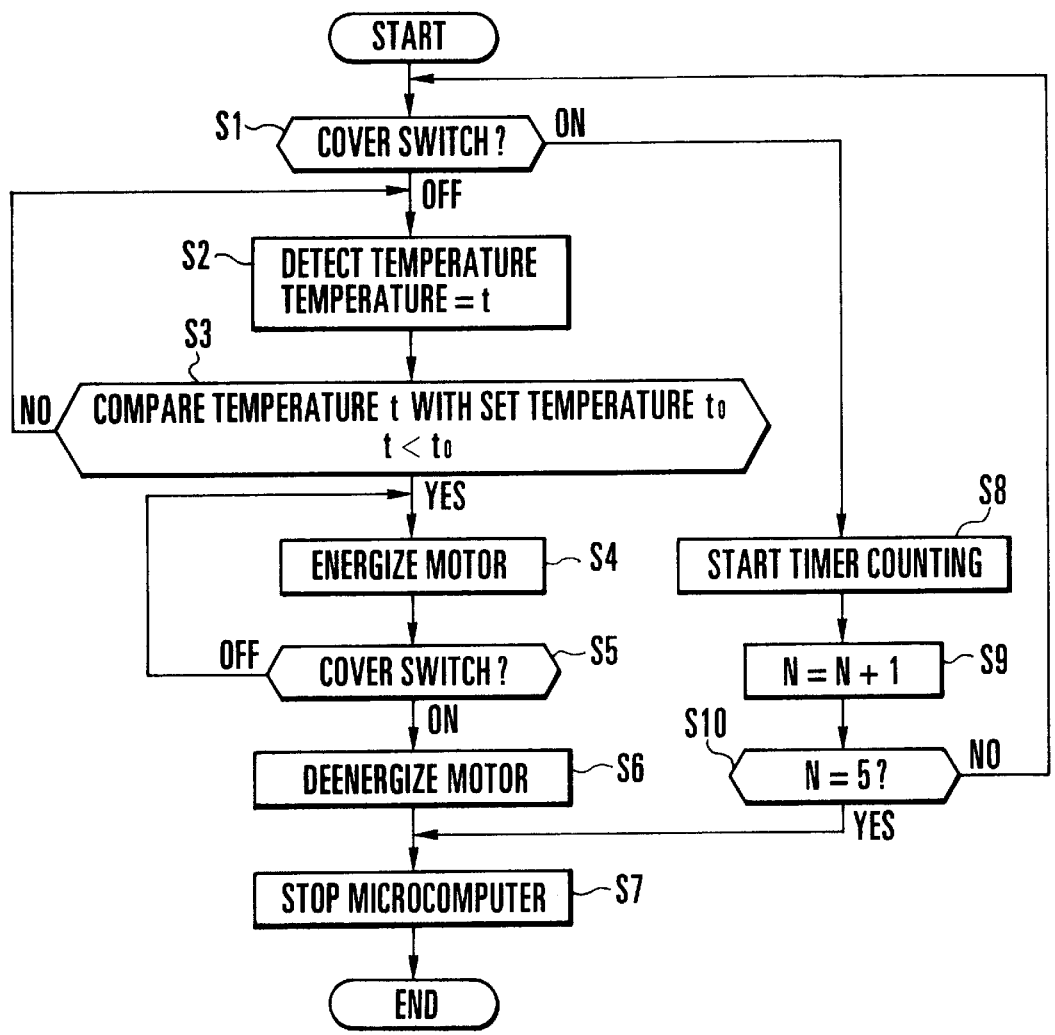
FIG. 10 is a flowchart of a microcomputer 33 of FIG. 9.

Incidentally, the operation flow of the third embodiment may be realized by partly modifying the flowchart of FIG. 10 of the second embodiment so as to energize and deenergize not the motor 40 but the shape memory alloy spring 55. Specifically, Step S4 may be assigned "ENERGIZE SHAPE MEMORY ALLOY SPRING 55 BY SHAPE MEMORY ALLOY DRIVING CIRCUIT 54" in place of "ENERGIZE MOTOR", and Step S5 may be assigned "DEENERGIZE SHAPE MEMORY ALLOY SPRING 55 BY SHAPE MEMORY ALLOY DRIVING CIRCUIT 54" in place of "DEENERGIZE MOTOR".

Although each of the above-described embodiments is arranged to pull and expand the shape memory alloy wire 15 up to the yield area, the present invention can also be applied to the case in which the shape memory alloy wire 15 is deformed within its elasticity area.

Although each of the above-described embodiments employs the V-shaped lever 24, the present invention can also be applied to another example in which the shape memory alloy wire 15 is expanded not by using the V-shaped lever 24 but by being directly pulled by the shape recovery force of the shape memory alloy spring 55 used in the third embodiment and, while the shape memory alloy wire 15 is recovering its shape, the shape recovery force of the shape memory alloy spring 55 does not work but the spring force thereof works, i.e., an arrangement which does not completely cancel but lessens the action of pulling and expanding the shape memory alloy wire 15 during the recovery of the shape of the shape memory alloy wire 15.

In addition, the present invention can also be applied to an arrangement which employs an illumination intensity detector or other similar devices capable of indirectly identifying the state of temperature, in place of the aforementioned temperature detector used in each of the second and third embodiments.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are all well-known in the camera arts and their specific construction and operation are not critical to the operation or best mode for carrying out the invention.

The present invention can also be carried out by combining the above-described embodiments or technical elements thereof with each other, as required.

The present invention can be applied to other kinds of arrangements. For example, the whole or part of the arrangement set forth herein or in the appended claims may constitute one apparatus, or may be connected to other apparatus, or may constitute an element which forms part of another apparatus.

The present invention can also be applied to various types of cameras such as a single-lens reflex camera, a lens shutter camera or a video camera, optical apparatuses other than such cameras, apparatuses other than the optical apparatuses, apparatuses applied to the cameras or the optical or other apparatuses, or elements which constitute part of such apparatuses.

What is claimed is:

1. An apparatus comprising:
   (A) a thermally shrinkable shape memory member;
   (B) a first force providing device which provides all the time said shape memory member with a force to pull said shape memory member; and
   (C) a second force providing device which provides said shape memory member with a force to pull said shape memory member, wherein said second force providing device does not provide said force when said shape memory member thermally shrinks.

2. An apparatus according to claim 1, wherein said apparatus includes a camera.

3. An apparatus according to claim 1, wherein said shape memory member includes a shape memory alloy.

4. An apparatus according to claim 1, wherein the force provided by said first force providing device is smaller than a yield strength of said shape memory member.

5. An apparatus according to claim 1, wherein said shape memory member includes a member which shrinks to a memorized shape above a predetermined temperature.

6. An apparatus according to claim 1, wherein said second force providing device provides a force which pulls said shape memory member into a yield zone of the shape memory member.

7. An apparatus according to claim 1, wherein said second force providing device is manually operated to provide the force.

8. An apparatus according to claim 1, wherein said second force providing device is operated by a motor to provide the force.

9. An apparatus according to claim 1, wherein said second force providing device provides the force by operation of an openable cover of said device.

10. An apparatus according to claim 1, wherein said second force providing device provides the force by another shape memory member.

11. An apparatus according to claim 1, wherein said second shape memory member is thermally operated to provide the force.

12. An apparatus comprising:
   (A) a thermally deformable shape memory member;
   (B) a first force providing device which all the time provides said shape memory member with a force acting in a direction contrary to a deformation direction of said shape memory member; and
   (C) a second force providing device which provides said shape memory member with a force which acts in a direction contrary to the thermal deformation direction of said shape memory member, wherein said second shape memory member does not provide the force when said shape memory member thermally deforms.

13. An apparatus according to claim 12, wherein said apparatus includes a camera.

14. An apparatus according to claim 12, wherein said shape memory member includes shape memory alloy.

15. An apparatus according to claim 12, wherein the force provided by said first force providing device is smaller than a yield strength of said shape memory member.

16. An apparatus according to claim 12, wherein said shape memory member includes a member which shrinks to a memorized shape above a predetermined temperature.

17. An apparatus according to claim 12, wherein said second force providing device provides a force which deforms said shape memory member into a yield zone of said member.

18. An apparatus according to claim 12, wherein said second force providing device is manually operated to provide the force.

19. An apparatus according to claim 12, wherein said second force providing device is operated by a motor to provide the force.

20. An apparatus according to claim 12, wherein said second force providing device provides the force by an openable cover of said device.

21. An apparatus according to claim 12, wherein said second force providing device provides the force by another shape memory member.

22. An apparatus according to claim 12, wherein said second force providing device thermally operates to provide the force.

23. An apparatus comprising:
   (A) a rotatable engaging claw;
   (B) an engagement portion engageable with the engaging claw;
   (C) a spring which exerts all the time a bias force to said engaging claw to engage with said engagement portion;
   (D) a shape memory member fixed at its end to said engaging claw, said shape memory member giving said engaging claw a force which acts to disengage the engagement between said engaging claw and the engagement portion against said spring; and
   (E) a force providing device which provides said shape memory with a force acting in the same direction as said spring, wherein said force providing device does not provide the force when the engaging claw is in engagement with said engagement portion.

24. An apparatus according to claim 23, wherein said apparatus includes a camera.

25. An apparatus according to claim 23, wherein said shape memory member includes a shape memory alloy.

26. An apparatus according to claim 23, wherein the bias force of said spring is smaller than a yield strength of said member.

27. An apparatus according to claim 23, wherein said force providing device gives said shape memory member a force acting in the same direction as said spring while said engaging claw and said engagement portion shift from a non-engagement state to the engagement state.

* * * * *

UNITED STATES PATENT AND TRADEMARK OFFICE
CERTIFICATE OF CORRECTION

PATENT NO. : 6,048,109
DATED : April 11, 2000
INVENTOR(S) : Hiroshi Kikuchi

It is certified that error appears in the above-identified patent and that said Letters Patent are hereby corrected as shown below:

Col. 1, line 61, delete "an d" and insert --and--.

Signed and Sealed this

Seventeenth Day of April, 2001

Attest:

NICHOLAS P. GODICI

*Attesting Officer*   *Acting Director of the United States Patent and Trademark Office*